(12) United States Patent
Li et al.

(10) Patent No.: US 12,273,437 B2
(45) Date of Patent: Apr. 8, 2025

(54) DATA PROCESSING METHOD AND APPARATUS FOR BLOCKCHAIN SYSTEM

(71) Applicant: TENCENT TECHNOLOGY (SHENZHEN) COMPANY LIMITED, Shenzhen (CN)

(72) Inventors: Maocai Li, Shenzhen (CN); Hu Lan, Shenzhen (CN); Zongyou Wang, Shenzhen (CN); Kaiban Zhou, Shenzhen (CN); Pan Liu, Shenzhen (CN); Gengliang Zhu, Shenzhen (CN); Yifang Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 206 days.

(21) Appl. No.: 17/955,422

(22) Filed: Sep. 28, 2022

(65) Prior Publication Data
US 2023/0014599 A1 Jan. 19, 2023

Related U.S. Application Data

(63) Continuation of application No. PCT/CN2021/124282, filed on Oct. 18, 2021.

(30) Foreign Application Priority Data

Nov. 20, 2020 (CN) .......................... 202011306241.0

(51) Int. Cl.
*H04L 9/32* (2006.01)
*H04L 9/06* (2006.01)
*H04L 9/08* (2006.01)

(52) U.S. Cl.
CPC .......... *H04L 9/0618* (2013.01); *H04L 9/0822* (2013.01); *H04L 9/0825* (2013.01); *H04L 9/0869* (2013.01)

(58) Field of Classification Search
CPC ... H04L 9/0618; H04L 9/0822; H04L 9/0825; H04L 9/0869; H04L 9/0861; H04L 9/088;
(Continued)

(56) References Cited

U.S. PATENT DOCUMENTS 10,986,080 B1 * 4/2021 Huang ...................... H04L 9/50
2019/0356674 A1 * 11/2019 Irazabal ............... H04L 63/102
(Continued)

FOREIGN PATENT DOCUMENTS

CN 111274599 A 6/2020
CN 111371790 A1 7/2020
(Continued)

OTHER PUBLICATIONS

The European Patent Office (EPO) The Extended European Search Report for 21893654.0 Dec. 6, 2023 8 Pages.
(Continued)

*Primary Examiner* — Quazi Farooqui
(74) *Attorney, Agent, or Firm* — ANOVA LAW GROUP, PLLC (57) ABSTRACT

A data processing method includes: determining, in response to a request of an access terminal for writing target data to a blockchain, a target node role with a read permission for the target data, an access terminal connected with each node device having a permission of a node role corresponding to the node device; acquiring an encryption key corresponding to the target node role; performing encryption processing on the target data according to the encryption key to obtain a cipher text corresponding to the target data, the cipher text corresponding to the target data being decryptable for an access terminal corresponding to the target node role; and storing the cipher text corresponding to the target data to the blockchain.

17 Claims, 5 Drawing Sheets

(58) Field of Classification Search
CPC ... H04L 9/50; H04L 9/32; G06F 16/27; G06F 21/45; G06F 21/602; G06F 21/6218
See application file for complete search history.

(56) References Cited

U.S. PATENT DOCUMENTS

2020/0162238 A1    5/2020  Yoon et al.
2021/0314164 A1*  10/2021  Lin .......................... H04L 9/14

FOREIGN PATENT DOCUMENTS

| CN | 111625869  A  | 9/2020  |
|----|---------------|---------|
| CN | 112131316  A  | 12/2020 |
| WO | 2019143849 A1 | 7/2019  |
| WO | 2020176475 A1 | 9/2020  |

OTHER PUBLICATIONS

The World Intellectual Property Organization (WIPO) International Search Report for PCT/CN2021/124282 Jan. 19, 2022 7 Pages (including translation).

* cited by examiner

DATA PROCESSING METHOD AND APPARATUS FOR BLOCKCHAIN SYSTEM

RELATED APPLICATION(S)

This application is a continuation application of PCT Patent Application No. PCT/CN2021/124282 filed on Oct. 18, 2021, which claims priority to China Patent Application No. 202011306241.0, filed on Nov. 20, 2020, in China National Intellectual Property Administration and entitled "Data Processing Method and Apparatus for Blockchain System", the contents of all of which are hereby incorporated by reference in entirety.

FIELD OF THE TECHNOLOGY

The present disclosure relates to the field of blockchain technology, and particularly to data processing for a blockchain system.

BACKGROUND

Different organizations manage different transactions, so data of different organizations is usually fragmented and stored in each organization. However, data is shared between organizations in some scenarios.

A method for implementing data sharing is to connect each organization that shares data to acquire data from the connected organizations. However, device interface standards and collaboration processes of different organizations are different. As a result, the efficiency of data sharing between organizations is quite low.

SUMMARY

In order to solve the technical problem, embodiments of the present disclosure provide a data processing method and apparatus for a blockchain system, an electronic device, and a computer-readable storage medium. According to the embodiments of the present disclosure, data is shared between different organizations by a blockchain technology, improving the efficiency of data sharing between different organizations to great extents.

In one aspect, the present disclosure provides a data processing method for a blockchain system, the blockchain system including multiple node devices, each of the multiple node devices being connected with at least one access terminal and corresponding to a node role, the access terminal having a permission of the node role corresponding to the connected node device, the method being performed by a node device in the blockchain system, the method including: determining, in response to a request of a target access terminal for writing target data to a blockchain, a target node role with a read permission for the target data, the target access terminal being one of access terminals connected with the node device; acquiring an encryption key corresponding to the target node role; performing encryption processing on the target data according to the encryption key to obtain a cipher text corresponding to the target data, the cipher text corresponding to the target data being decryptable for an access terminal corresponding to the target node role; and storing the cipher text corresponding to the target data to the blockchain.

In another aspect, the present disclosure provides a data processing apparatus for a blockchain system, the blockchain system including multiple node devices, each of the multiple node devices being connected with at least one access terminal and corresponding to a node role, the access terminal having a permission of the node role corresponding to the connected node device, the apparatus being configured on a node device in the blockchain system, the apparatus including: a memory storing computer program instructions; and a processor coupled to the memory and configured to execute the computer program instructions and perform: determining, in response to a request of a target access terminal for writing target data to a blockchain, a target node role with a read permission for the target data, the target access terminal being one of access terminals connected with the node device; acquiring an encryption key corresponding to the target node role; performing encryption processing on the target data according to the encryption key to obtain a cipher text corresponding to the target data, the cipher text corresponding to the target data being decryptable for an access terminal corresponding to the target node role; and storing the cipher text corresponding to the target data to the blockchain In yet another aspect, the present disclosure provides a data processing method for a blockchain system, the blockchain system including multiple node devices, each of the multiple node devices being connected with at least one access terminal and corresponding to a node role, the access terminal having a permission of the node role corresponding to the connected node device, the method being performed by a node device in the blockchain system, the method including: transmitting, in response to a request of a target access terminal for reading target data, a cipher text corresponding to the target data stored in a blockchain to the target access terminal such that the target access terminal decrypts the cipher text corresponding to the target data according to a private key corresponding to a node role corresponding to the target access terminal to obtain the target data, the target access terminal being one of access terminals connected with the node device, the cipher text corresponding to the target data being obtained by performing encryption processing on the target data according to an encryption key, and the encryption key being an encryption key corresponding to a target node role with a read permission for the target data.

In yet another aspect, the present disclosure provides an electronic device, including a processor and a memory, the memory storing a computer-readable instruction that is executed by the processor to implement the data processing method for a blockchain system as described in the above aspect.

In yet another aspect, the present disclosure provides a computer-readable storage medium, storing a computer program that is used for performing the data processing method for a blockchain system as described in the above aspect.

In yet another aspect, the present disclosure provides a computer program product or a computer program, the computer program product or the computer program including computer instructions, the computer instructions being stored in a computer-readable storage medium. A processor of a computing device reads the computer instructions from the computer-readable storage medium, and the processor executes the computer instructions, to cause the computing device to perform the data processing method for a blockchain system as described in the above aspect.

In the technical solutions provided in the embodiments of the present disclosure, the node devices in the blockchain system may be implemented as servers of different organizations. All block data is stored in each node device, namely data of each organization is stored in the blockchain, so each organization may acquire the data of the other organizations from the blockchain. As such, standard and general data sharing is implemented by a blockchain technology, greatly improving the data sharing efficiency.

Moreover, the read permission for the block data stored in the blockchain is set for the access terminals through the node roles, and the access terminal connected with each node device has the permission of the node role corresponding to the node device, so the data in the blockchain may be obtained only by the other access terminals with the read permission for the data, namely only the organization with the read permission may obtain the data of the other organizations from the blockchain. Therefore, not only is the efficiency of data sharing between different organizations improved, but also the data sharing security may be ensured.

It is to be understood that the general descriptions and the following descriptions are merely for illustration and explanation purposes and are not intended to limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s)," "some embodiments," "certain embodiment(s)," or "certain embodiments" may refer to one or more subsets of all possible embodiments. When and as applicable, the term "an embodiment," "one embodiment," "some embodiment(s)," "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

The block diagrams shown in the accompany drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change.

"Plurality of" mentioned in the present disclosure means two or more. And/or describes an association relationship for describing associated objects and represents that three relationships may exist. For example, A and/or B may represent the following three cases: only A exists, both A and B exist, and only B exists. The character "/" generally indicates an "or" relationship between the associated objects.

Figure 1:
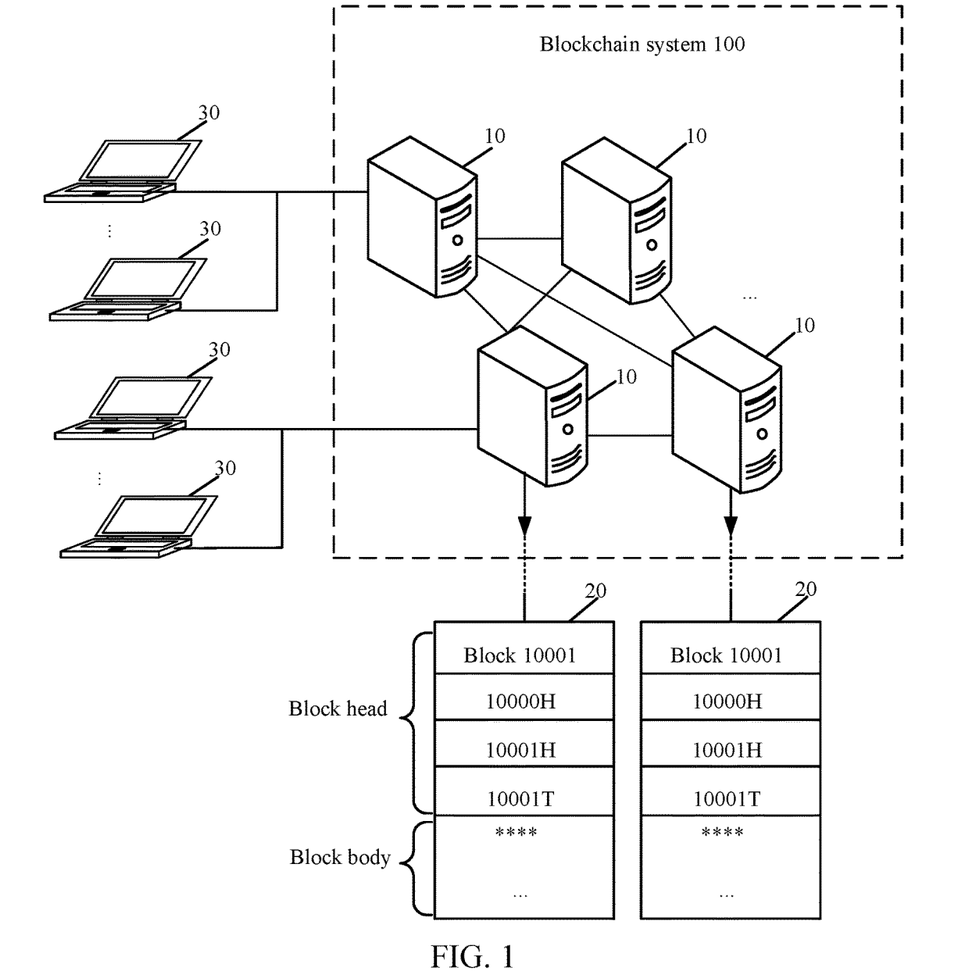
FIG. 1 is a schematic diagram of an implementation environment according to certain embodiment(s) of the present disclosure.

Referring to FIG. 1, FIG. 1 is a schematic diagram of an implementation environment involved in the present disclosure. The implementation environment is a blockchain system.

The blockchain system 100 in FIG. 1 refers to a system for data sharing between node devices 10. A blockchain 20 is stored in each node device 10. As shown in FIG. 1, the blockchain 20 includes multiple blocks. Each block includes a block head and a block body. A block height and other information are stored in the block head. It can be seen that block data stored in each node device 10 is the same.

Each node device 10 is connected with at least one access terminal 30. For example, the access terminal 30 may be connected with the node device through a wired or wireless network, to implement data interaction with the node device 10. Any access terminal 30 may write data to the blockchain 20 or read data stored in the blockchain 20, to implement efficient sharing of the block data.

The blockchain 20 usually stores massive complex data. In an exemplary scenario, the node devices 10 are implemented as servers of different state departments (such as the ministry of public security, the ministry of civil affairs, the administration of taxation, the ministry of industry and commerce, and the ministry of education) deployed in the blockchain system 100 respectively, so the blockchain 20 stores data of each state department. The access terminal 30 connected with the node device 10 is implemented as a user access terminal of the corresponding state department.

Data of the state departments is usually highly confidential, and if the data is leaked, there may be serious consequences. Therefore, when data is shared between different state departments, the blockchain system 100 configures permissions for block data stored in the blockchain 20, such as read permissions and write permissions, to ensure data security. For example, the administration of taxation, when dealing with deduction on the individual income tax of a user, may read, from the blockchain 20, but not modify children education, parent supporting, housing load, and other data of the user. For another example, the ministry of public security may modify only the data of its own stored in the blockchain 20, such as registered residences and criminal records of users, but not the data of the other state departments stored in the blockchain 20.

It can thus be seen that, based on the blockchain system 100 shown in FIG. 1, not only may data be shared efficiently, but also data security during data sharing may be ensured. Therefore, any scenario with desirables for sharing efficiency and data security during data sharing may be satisfied. For example, the blockchain system may also be applied to scenarios of data sharing between departments or branches of an enterprise and data sharing between multiple persons. No limits are made thereto herein.

The access terminal 30 in the blockchain system 100 shown in FIG. 1 may be an electronic device, such as a smart phone, a tablet computer, a notebook computer, and a computer. The node device 10 may be an independent physical server, or may be a server cluster or a distributed system formed by a plurality of physical servers, or may further be a cloud server that provides cloud computing services such as a cloud service, a cloud database, cloud computing, a cloud function, cloud storage, a network service, cloud communication, a middleware service, a domain name service, a security service, a content delivery network (CDN), big data, and an AI platform, which is not limited herein.

Figure 2:
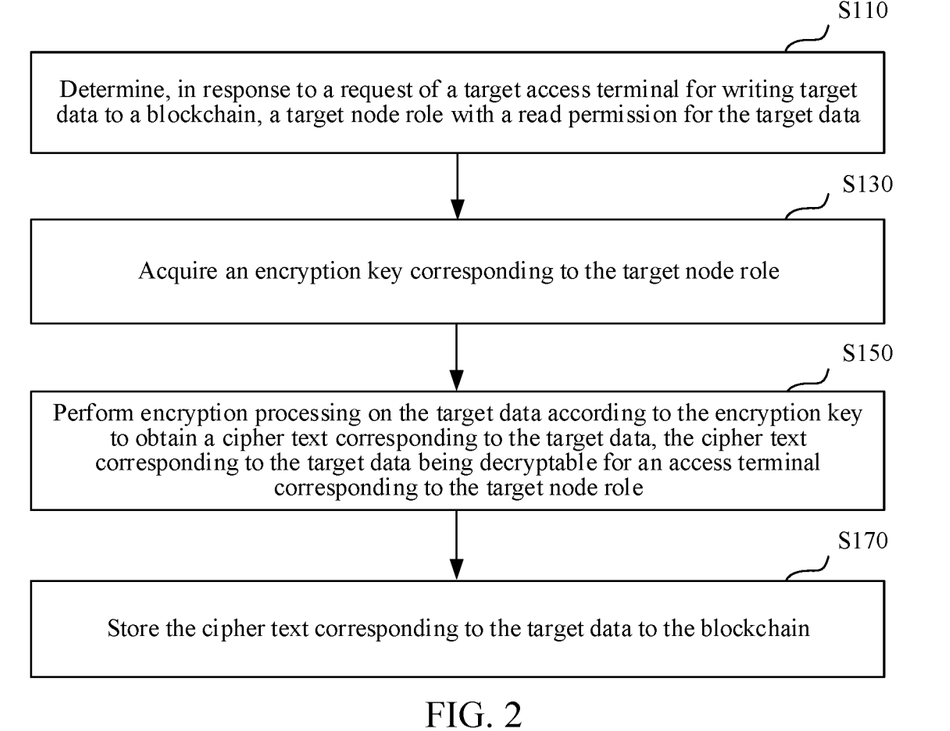
FIG. 2 is a schematic flowchart of a data processing method for a blockchain system according to certain embodiment(s) of the present disclosure.

FIG. 2 is a flowchart of a data processing method for a blockchain system according to an exemplary embodiment of the present disclosure.

The blockchain system that the method is used for may be the blockchain system 100 shown in FIG. 1. The method may be performed by any node device 10 in the blockchain system 100.

In some other embodiments, the method may be applied to another blockchain system that includes multiple node devices to perform the method through any node device. Each node device is connected with one or more access terminals. A blockchain is stored in each node device. That is, all block data is stored in each node device. Corresponding permissions are configured for the block data in the blockchain.

Permissions of the block data may include a read permission and a write permission. An access terminal with the read permission for a piece of block data may read the block data from the blockchain. An access terminal with the write permission for a piece of block data may modify the block data stored in the blockchain.

In addition, each node device corresponds to a node role, and the access terminal connected with each node device has a permission of the node role corresponding to the node device, to implement consistent management of the permissions of the multiple access terminals for the block data based on the node role. That is, a node device is usually connected with multiple access terminals, and the multiple access terminals usually have the same data permission for the block data, so the access terminals connected with the same node device correspond to the same node role, the node role corresponding to the connected node device. In the above example, access terminals corresponding to the same state department correspond to the same node role, a node role corresponding to this state department.

In addition, different node devices generally correspond to different node roles. However, in practical applications, multiple node devices may correspond to the same node role. For example, data of a state department is characterized by large data size, high data complexity, etc., so multiple node devices are usually deployed to process the data. In such case, each node device corresponding to the same state department corresponds to the same node role, to ensure that access terminals corresponding to the same state department have the same permission for block data and further ensure consistent management of the block data by the blockchain system.

As shown in FIG. 2, in an exemplary embodiment, the data processing method for a blockchain system may include S110 to S170, which will be described in detail as follows.

S110: Determine, in response to a request of a target access terminal for writing target data to a blockchain, a target node role with a read permission for the target data.

First, the target access terminal is connected with a node device that performs the data processing method for a blockchain system in the embodiment of the present disclosure. The node device is any node device in the blockchain system. As a request initiator, the target access terminal is configured to make a request of writing the target data to the blockchain.

In some embodiments, the request of the target access terminal for writing the target data to the blockchain is a request of adding, to the blockchain, data to be stored. For example, the request is implemented as a request of the ministry of public security for adding user information of a newborn to the blockchain. In some other embodiments, the request of the target access terminal for writing the target data to the blockchain is a request of modifying blockc data stored in the blockchain. For example, the request is implemented as a request of the ministry of civil affairs for modifying a marital status of a user stored in the blockchain from unmarried to married.

The node device, after receiving the request transmitted by the target access terminal, acquires a target node role with a read permission for the target data in response to the request of the target access terminal for writing the target data to the blockchain, and further acquires, according to the target node role, an encryption key for encrypting the target data. That is, the target data in this embodiment is stored in the blockchain in form of a cipher text, to ensure secure storage of the target data in the blockchain.

To ensure the security of the block data, important data stored in the blockchain is stored in form of a cipher text, and only an access terminal with a permission may successfully decrypt the cipher text corresponding to the data to actually obtain the data.

In some embodiments, the target data requested to be written to the blockchain by the target access terminal includes a key field, and the target node role with the read permission for the target data may be obtained according to the key field. That is, the target access terminal sets information about the read permission for the target data in the key field, to restrict the target data through the information to be obtained only by an access terminal with the read permission for the target data after being stored to the blockchain.

The target access terminal may also set information about a write permission for the target data in the key field, to restrict the target data to be obtained only by an access terminal with the write permission for the target data after being stored to the blockchain.

Generally speaking, any access terminal corresponding to the same node role corresponding to the target access terminal may have the write permission and the read permission for the target data. For example, all access terminals corresponding to the same state department may modify and read data of their own department stored in the blockchain. Therefore, in some embodiments, the target node role with the read permission for the target data may include a node role corresponding to the target access terminal. The node role corresponding to the target access terminal may also be obtained according to the key field in the target data.

In some other embodiments, for example, in some scenarios where block data permissions are managed in a standardized manner, the target node role with the read permission for the target data may be determined according to a node role corresponding to the target access terminal.

For example, in a scenario where block data permissions are managed in a standardized manner, a mapping rule between a node role and a block data permission is pre-stored in the node device. For example, the mapping rule specifies that data written by an access terminal corresponding to node role A to the blockchain may be legally obtained only by access terminals corresponding to node role B and node role C. Therefore, after the access terminal corresponding to node role A makes a request of writing target data to the blockchain, node role B and node role C may directly be determined as target node roles with the read permission for the target data.

S130: Acquire an encryption key corresponding to the target node role.

As mentioned above, in this embodiment, the acquired encryption key is used for performing encryption processing on the target data to obtain a cipher text corresponding to the target data. After the cipher text corresponding to the target data is stored to the blockchain, only an access terminal with the read permission for the target data may obtain the target data. Therefore, reliable storage of the target data in the blockchain is implemented.

In order to ensure reliable storage of the target data in the blockchain, in some embodiments, the encryption key for performing the encryption processing on the target data may be a symmetric key generated in the node device. The node device further transmits the generated symmetric key to the access terminal corresponding to the target node role to enable the access terminal corresponding to the target node role to successfully decrypt the cipher text corresponding to the target data according to the received symmetric key, to obtain the target data.

An access terminal without the read permission for the target data does not receive the symmetric key transmitted by the node device, and thus may not decrypt the cipher text corresponding to the target data. It can be seen that even though the cipher text corresponding to the target data may be obtained by any access terminal, only the access terminal with the read permission for the target data may decrypt the cipher text to obtain the target data, so that highly reliable and secure storage of the target data in the blockchain is ensured.

In some other embodiments, the encryption key for performing the encryption processing on the target data is a shared public key corresponding to each target node role. The cipher text obtained by encrypting the target data based on the shared public key may be successfully decrypted by a private key corresponding to each target node role.

Therefore, after the cipher text corresponding to the target data is stored to the blockchain, an access terminal with the read permission for the target data may decrypt the cipher text corresponding to the target data according to a private key corresponding to a node role corresponding to this access terminal to successfully obtain the target data. An access terminal without the read permission for the target data may still perform a decryption process on the cipher text corresponding to the target data according to a private key corresponding to a node role corresponding to this access terminal, but cannot succeed. Therefore, highly reliable storage of the target data in the blockchain may be ensured.

S150: Perform encryption processing on the target data according to the encryption key to obtain a cipher text corresponding to the target data, the cipher text corresponding to the target data being decryptable for an access terminal corresponding to the target node role.

In this embodiment, encryption processing is performed on the target data based on the encryption key obtained in S130, namely an encryption operation is performed on the target data according to the encryption key, to obtain a cipher text corresponding to the target data.

The encryption key for performing the encryption processing on the target data is determined according to each target node role with the read permission for the target data, so the cipher text corresponding to the target data may be successfully decrypted only by an access terminal corresponding to the target node role. Therefore, it is further ensured that the cipher text corresponding to the target data may be obtained only by an access terminal with the read permission for the cipher text after being stored to the blockchain.

S170: Store the cipher text corresponding to the target data to the blockchain.

In the blockchain system, the block data stored in each node device is the same, and the cipher text corresponding to the target data is also stored in the blockchain deployed in each node device consistently. Therefore, consensus decision-making may be performed on the cipher text corresponding to the target data in the blockchain system, and a feed operation may be performed on the target data after a consensus is reached. As such, it is ensured that the blockchain stored in each node device is performed. For example, all or part of the node devices in the blockchain system may perform consensus decision-making on the cipher text corresponding to the target data as consensus nodes.

It can be seen that, in the technical solution provided in the embodiment, taking the node devices being implemented as servers of different state departments as an example, each state department maintains its own data on the blockchain. For example, for a certain user, each state department maintains data of the user in some fields on the blockchain, and then data is shared between different state departments through the blockchain. Therefore, the data sharing efficiency may be improved greatly.

In addition, in the technical solution provided in this embodiment, the security and reliability of the block data stored in the blockchain are ensured through the node roles corresponding to the node devices. Taking the node devices being implemented as servers of different state departments as an example, permissions are set for the data stored in the blockchain, and if data of a certain user occupies 100 fields in the blockchain, the ministry of civil affairs has the read permission for 40 of the 100 fields and the write permission for 10 of the 100 fields. Therefore, consistent maintenance of the block data by multiple departments is implemented. In addition, least permissions for the block data are ensured, namely the read permission and/or write permission for the block data are/is least.

Figure 3:
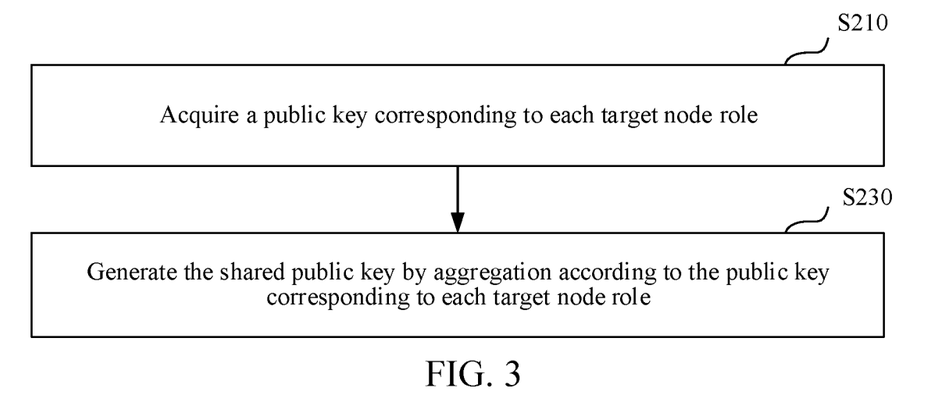
FIG. 3 is a schematic flowchart of acquiring an encryption key corresponding to a target node role according to certain embodiment(s) of the present disclosure.

FIG. 3 is a flowchart of acquiring an encryption key corresponding to a target node role according to an exemplary embodiment of the present disclosure. As shown in FIG. 3, the operation of acquiring an encryption key corresponding to the target node role in S130 may include S210 to S230. In this embodiment, the encryption key includes a shared public key. Descriptions are made below.

S210: Acquire a public key corresponding to each target node role.

First, in this embodiment, the public key corresponding to each target node role is correlated with a private key corresponding to each target node role. For example, a cipher text obtained by performing data encryption based on the public key corresponding to the target node role may be decrypted by the private key corresponding to the target node role to obtain unencrypted original data, and a signature obtained based on the private key corresponding to the target node role may be verified by the public key corresponding to the target node role.

In some embodiments, each of node devices corresponding to different node roles in the blockchain system may pre-generate a pair of private key and public key corresponding to the node role corresponding to the node device. The generated private key is synchronized to each access terminal connected with the node device for storage, and the generated public key is transmitted to the blockchain system. For example, the node device may transmit the generated public key to an authoritative device such that the authoritative device configures the received public key in an authoritative certificate and issues the authoritative certificate to each node device.

It is to be understood that the authoritative device may be a node device in the blockchain system. This node device is authoritative such that the other node devices trust the authoritative certificate issued by the authoritative device. Therefore, each node device in the blockchain system may obtain the public keys corresponding to different node roles and further obtain the public key corresponding to each target node role.

In some other embodiments, a random number corresponding to each target node role may be generated in each node device, and the public key corresponding to each target node role is further generated according to the random number corresponding to each target node role. Generating the corresponding public key according to the random number is a process of performing an encryption operation on the random number to determine an operation result as the corresponding public key.

Due to randomness of random number, the random numbers corresponding to the target node roles in the node device are different. Therefore, public keys corresponding to the target node roles in the node device are also different.

In addition, in order to enable an access terminal with the read permission for the target data to successfully decrypt the cipher text corresponding to the target data based on the private key corresponding to the node role corresponding to the access terminal, the node device transmits the random number corresponding to each target node role to the access terminal corresponding to the node role such that the access terminal generates the private key corresponding to the node role corresponding to the access terminal based on the received random number. Therefore, any access terminal with the read permission for the target data may generate a private key corresponding to the node role corresponding to the access terminal according to a received random number, and successfully decrypt the cipher text corresponding to the target data based on the private key.

S230: Generate the shared public key by aggregation according to the public key corresponding to each target node role.

As mentioned above, the shared public key in this embodiment has the following characteristic: the cipher text obtained by encrypting the target data based on the shared public key is decryptable for the private key corresponding to each target node role. Therefore, in this embodiment, the shared public key is generated by aggregation according to the public key corresponding to each target node role. Aggregation refers to a process of establishing a correlation between a shared public key and a private key corresponding to each target node role according to the private key corresponding to each target node role.

In some embodiments, aggregation between the public keys corresponding to each target node role may be implemented by a threshold signature (Threshold Sig) algorithm. Specifically, a threshold signature is calculated for the public key corresponding to each target node role based on the threshold signature algorithm. In addition, the threshold signature is configured to be verifiable by private keys corresponding to at least n (0<n<m, m being the total number of the target node roles) target node roles. The threshold signature configured as such is obtained as the shared public key. In this embodiment, n may be valued to 1 such that any access terminal corresponding to the target node role to successfully decrypt the cipher text corresponding to the target data stored in the blockchain.

In some other embodiments, the public key corresponding to each target node role may be concatenated to obtain a concatenated sequence. Then, a coding operation is performed on the concatenated sequence to obtain a coded sequence. In addition, it is configured that, during decoding of the coded sequence, the coded sequence is successfully decoded when any segment of public key data in the concatenated sequence is obtained by decoding. The configured coded sequence is obtained as the shared public key.

It can be seen that the cipher text corresponding to the target data obtained by performing the encryption processing on the target data based on the shared public key obtained above is decrytable for the private key corresponding to any target node role but non-decryptable for private keys corresponding to the other node roles except the target node role. Therefore, secure and reliable storage of the target data in the blockchain is ensured.

In another embodiment of the present disclosure, in order to improve the storage security of the target data in the blockchain, the target data is also stored in the blockchain by a digital envelope.

In an implementation mode, for S170, in this embodiment, on one hand, encryption processing is performed on the target data according to the encryption key corresponding to the target node role, and a cipher text corresponding to the target data obtained by encryption is stored in the blockchain. On the other hand, encryption processing is performed on the encryption key to obtain a cipher text corresponding to the encryption key (namely a digital envelope is obtained), and the cipher text corresponding to the encryption key and the cipher text corresponding to the target data are stored in the blockchain together.

If an access terminal is intended to read the target data from the blockchain, a decryption process is performed first on the cipher text corresponding to the encryption key to obtain the encryption key, and then a decryption process is performed on the cipher text corresponding to the target data according to the obtained encryption key to obtain the target data. It can be seen that, in this embodiment, the target data is encrypted in two layers, and the access terminal performs encryption operations of two layers to obtain the target data. Therefore, the security of the target data is further improved.

To realize that the access terminal can successfully decrypt the cipher text corresponding to the target data according to the encryption key obtained by decrypting the cipher text corresponding to the encryption key, the encryption key used in this embodiment may be a symmetric key. The encryption processing on the target data based on the encryption key is a process of performing an encryption operation on the target data using a symmetric encryption algorithm.

In some embodiments, the encryption key may be encrypted according to a shared key corresponding to each target node role to obtain the cipher text corresponding to the encryption key. In such scenario, only an access terminal with the read permission for the target data may decrypt the cipher text corresponding to the encryption key according to a private key corresponding to a node role corresponding to the access terminal, to obtain the encryption key. Therefore, based on the encryption manner provided in this embodiment, it may be ensured that only an access terminal with the read permission for the target data may obtain the target data stored in the blockchain.

Figure 4:
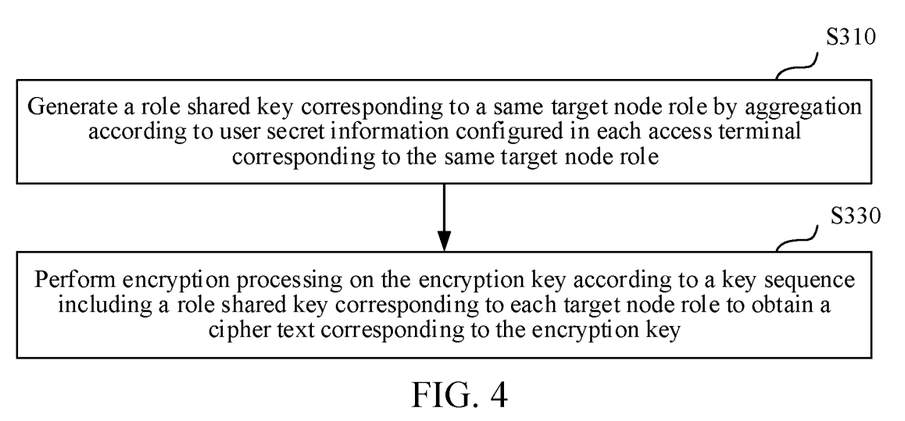
FIG. 4 is a schematic flowchart of acquiring a role shared key corresponding to a target node role according to certain embodiment(s) of the present disclosure.

In another embodiment, the encryption key may be encrypted according to a role shared key corresponding to each target node role to obtain the cipher text corresponding to the encryption key. As shown in FIG. 4, generation and use of the role shared key corresponding to each target node role may refer to S310 to S330. Descriptions are made below.

S310: Generate a role shared key corresponding to a same target node role by aggregation according to user secret information configured in each access terminal corresponding to the same target node role.

In this embodiment, access terminals corresponding to each of different target node roles with the read permission for the target data form a subset, and a key is allocated to each subset. As such, role shared keys respectively corresponding to different target node roles are obtained.

Specifically, user secret information is configured in each access terminal in each subset, which may be any information, but each access terminal may not obtain the user secret information of the other access terminals in the subset. Different users usually correspond to different user secret information. Therefore, in this embodiment, the obtained role shared keys respectively corresponding to different target node roles are also different.

S330: Perform encryption processing on the encryption key according to a key sequence including a role shared key corresponding to each target node role to obtain a cipher text corresponding to the encryption key.

If the role shared key corresponding to the target node role is represented by Ki, the key sequence including the role shared key corresponding to each target node role may be represented as "Ki1, Ki2, . . . , Kim", where m represents the total number of the target node roles. A session key may be encrypted according to the key sequence to obtain a cipher text like "i1, i2, . . . , im, EKi1(K), EKi2(K), . . . , EKim(K)".

In this embodiment, only an access terminal with the read permission for the target data may decrypt the cipher text corresponding to the encryption key according to user secret information configured in the access terminal, to obtain the encryption key. Therefore, based on the encryption manner provided in this embodiment, it may also be ensured that only an access terminal with the read permission for the target data may obtain the target data stored in the blockchain.

Figure 5:
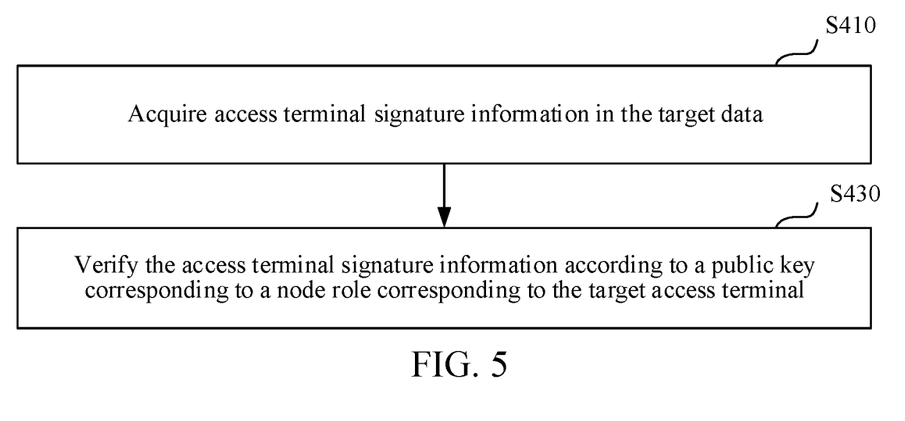
FIG. 5 is a schematic flowchart of another data processing method for a blockchain system according to certain embodiment(s) of the present disclosure.

FIG. 5 is a flowchart of another data processing method for a blockchain system based on the embodiment shown in FIG. 2. As shown in FIG. 5, before the operation of determining a target node role with a read permission for the target data in S110, the method further includes S410 to S430. Descriptions are made below.

S410: Acquire access terminal signature information in the target data.

In this embodiment, the access terminal signature information is obtained by the target access terminal signing the information according to its own private key, and is contained in the target data. The node device, after receiving the request of the target access terminal for writing the target data to the blockchain, acquires the access terminal signature information contained in the target data.

S430: Verify the access terminal signature information according to a public key corresponding to a node role corresponding to the target access terminal.

The node device, after acquiring the access terminal signature information, verifies the access terminal signature information according to a public key corresponding to a node role corresponding to the target access terminal. If the verification of the access terminal signature information succeeds, it indicates that the target access terminal has the write permission for the target data, and thus S110 is performed. If the verification of the access terminal signature information does not succeed, it indicates that the target access terminal does not have the write permission for the target data, and the node device rejects the request of the target access terminal for writing the target data to the blockchain.

The node device can store the public keys corresponding to different node roles. For example, as described in the embodiment, each of node devices corresponding to different node roles in the blockchain system may pre-generate a pair of private key and public key corresponding to the node role corresponding to the node device, and the generated private key is synchronized to each node device for storage. Therefore, in an implementation mode, for S430, the node device may determine a node role corresponding to a node device that the target data involves according to a key field in the target data, then locally acquire the stored public key corresponding to this node role, and further verify the access terminal signature information according to the determined public key.

Therefore, according to the technical solution of this embodiment, after the request of the target access terminal for writing the target data to the blockchain is received, whether the target access terminal has the write permission for the target data is further verified, so reliable storage of the target data in the blockchain is further ensured. For example, if the ministry of public security makes a request of modifying data that the ministry of housing and urban-rural development has the write permission in the blockchain, the node device, after receiving the request initiated by the ministry of public security, rejects the request of the ministry of public security if determining that the ministry of public security does not have the write permission for the data. Therefore, the data in the blockchain is prevented from being tampered illegally, and reliable storage of the block data in the blockchain is further ensured.

In another embodiment, if being intended to read the target data stored in the blockchain, the target access terminal may initiate a request of reading the target data stored in the blockchain. The target access terminal may be any access terminal. Moreover, the target access terminal is not necessarily a requester of writing the target data stored in the blockchain.

The node device transmits, in response to the request of the target access terminal for reading the target data stored in the blockchain, a cipher text corresponding to the target data stored in the blockchain to the target access terminal such that the target access terminal decrypts the cipher text corresponding to the target data according to a private key corresponding to a node role corresponding to the target access terminal to obtain the target data.

The access terminal connected with each node device has a permission of the node role corresponding to the node device. The cipher text corresponding to the target data is obtained by performing encryption processing on the target data according to an encryption key. The encryption key is an encryption key corresponding to a target node role with a read permission for the target data. An acquisition process of the encryption key and encryption processing of the target data refer to the embodiment, and will not be elaborated herein.

If the target data is stored in the blockchain in form of a digital envelope, namely not only the cipher text corresponding to the target data but also a cipher text corresponding to the encryption key is stored in the blockchain, the node device further transmits the cipher text corresponding to the encryption key stored in the blockchain to the target access terminal such that the target access terminal decrypts the cipher text corresponding to the encryption key according to the private key corresponding to the node role corresponding to the target access terminal, and decrypts the cipher text corresponding to the target data according to the encryption key obtained by decryption.

The cipher text corresponding to the encryption key is obtained by performing encryption processing on the encryption key according to a shared key corresponding to the target node role. The shared key is generated by aggregation according to a public key corresponding to each target node role. A process refers to the contents described in detail in the embodiment, and will not be elaborated herein.

In addition, the node device may transmit the cipher text corresponding to the target data and the cipher text corresponding to the encryption key, that are stored in the blockchain, to the target access terminal by broadcasting. The target access terminal, after receiving the information broadcast by the node device, decrypts the received cipher text corresponding to the encryption key according to the private key corresponding to the node role corresponding to the target access terminal, and decrypts the cipher text corresponding to the target data according to the encryption key obtained by decryption.

The private key corresponding to the node role corresponding to the target access terminal may include user secret information configured in the target access terminal. The cipher text corresponding to the encryption key is obtained by performing encryption processing on the encryption key according to a key sequence including a role shared key corresponding to each target node role. The role shared key is generated by aggregation according to user secret information configured in each access terminal corresponding to the same target node role. A process also refers to the contents described in detail in the embodiment, and will not be elaborated herein.

From the above, according to the technical solution of the present disclosure, not only is consistent maintenance of the block data by multiple node roles implemented, but also least permissions for the block data are ensured, so the multiple node roles may share data efficiently through the blockchain, and in addition, the security and reliability of the data in the blockchain may be ensured. Therefore, any scenario with desires for sharing efficiency and data security during data sharing may be satisfied. For example, the method may also be applied to scenarios of data sharing between departments or branches of an enterprise and data sharing between multiple persons. No limits are made thereto herein.

Figure 6:
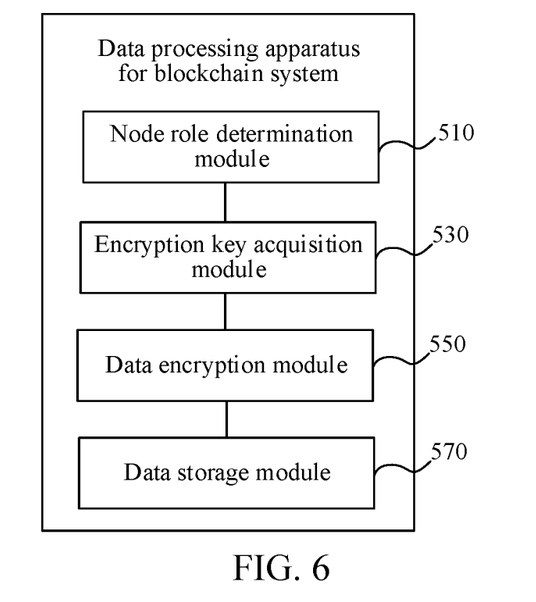
FIG. 6 is a schematic block diagram of a data processing apparatus for a blockchain system according to certain embodiment(s) of the present disclosure.

FIG. 6 is a block diagram of a data processing apparatus for a blockchain system according to an exemplary embodiment of the present disclosure. The blockchain system includes multiple node devices. Each of the node devices is connected with at least one access terminal. The access terminal has a permission of a node role corresponding to the connected node device. The apparatus is configured on a node device in the blockchain system. As shown in FIG. 6, the apparatus may include: a node role determination module 510, configured to determine, in response to a request of a target access terminal for writing target data to a blockchain, a target node role with a read permission for the target data, the target access terminal being one of access terminals connected with the node device; an encryption key acquisition module 530, configured to acquire an encryption key corresponding to the target node role; a data encryption module 550, configured to perform encryption processing on the target data according to the encryption key to obtain a cipher text corresponding to the target data, the cipher text corresponding to the target data being decryptable for an access terminal corresponding to the target node role; and a data storage module 570, configured to store the cipher text corresponding to the target data to the blockchain.

In another exemplary embodiment, the encryption key includes a shared public key. The encryption key acquisition module 530 includes: a public key acquisition unit, configured to acquire a public key corresponding to each target node role; and a shared public key generation unit, configured to generate the shared public key by aggregation according to the public key corresponding to each target node role, the cipher text obtained by encrypting the target data based on the shared public key being decryptable for a private key corresponding to each target node role.

In another exemplary embodiment, the public key acquisition unit includes: a random number generation subunit, configured to generate, in the node device, a random number corresponding to each target node role; a public key generation subunit, configured to generate the public key corresponding to each target node role according to the random number corresponding to each target node role; and a random number transmission subunit, configured to transmit the random number corresponding to each target node role to the access terminal corresponding to the target node role such that the access terminal generates the private key corresponding to the node role corresponding to the access terminal based on the received random number.

In another exemplary embodiment, the encryption key includes a symmetric key. The encryption key acquisition module 530 includes: a symmetric key generation unit, configured to generate, in the node device, the symmetric key; and a symmetric key transmission unit, configured to transmit the symmetric key to the access terminal corresponding to the target node role to enable the access terminal corresponding to the target node role to decrypt the cipher text corresponding to the target data according to the received symmetric key.

In another exemplary embodiment, the apparatus further includes: a first key encryption module, configured to encrypt the encryption key according to a shared key corresponding to each target node role to obtain a cipher text corresponding to the encryption key. The data storage module is further configured to store the cipher text corresponding to the encryption key and the cipher text corresponding to the target data to the blockchain together.

In another exemplary embodiment, the apparatus further includes: a role shared key acquisition module, configured to generate a role shared key corresponding to a same target node role by aggregation according to user secret information configured in each access terminal corresponding to the same target node role; and a second key encryption module, configured to perform encryption processing on the encryption key according to a key sequence including a role shared key corresponding to each target node role to obtain a cipher text corresponding to the encryption key. The data storage module is further configured to store the cipher text corresponding to the encryption key and the cipher text corresponding to the target data to the blockchain together.

In another exemplary embodiment, the apparatus further includes: a signature acquisition module, configured to acquire access terminal signature information in the target data; and a signature verification module, configured to verify the access terminal signature information according to a public key corresponding to a node role corresponding to the target access terminal, and trigger, when or in response to determining that the verification of the access terminal signature information succeeds, the node role determination module to perform the step of determining a target node role with a read permission for the target data.

In another exemplary embodiment, the signature verification module includes: a field information acquisition unit, configured to determine the node role corresponding to the target access terminal according to a key field in the target data; and a signature information verification unit, configured to search a locally stored public key list for the public key corresponding to the node role corresponding to the target access terminal, and verify the access terminal signature information according to the found public key.

The embodiments of the present disclosure also provide another data processing apparatus for a blockchain system, including: a first cipher text transmission module, configured to transmit, in response to a request of a target access terminal for reading target data stored in a blockchain, a cipher text corresponding to the target data stored in the blockchain to the target access terminal, the access terminal having a permission of a node role corresponding to a connected node device, such that the target access terminal decrypts the cipher text corresponding to the target data according to a private key corresponding to the node role corresponding to the target access terminal to obtain the target data, the target access terminal being one of access terminals connected with the node device, the cipher text corresponding to the target data being obtained by performing encryption processing on the target data according to an encryption key, and the encryption key being an encryption key corresponding to a target node role with a read permission for the target data.

In another exemplary embodiment, the apparatus further includes: a second cipher text transmission module, configured to transmit a cipher text corresponding to the encryption key stored in the blockchain to the target access terminal such that the target access terminal decrypts the cipher text corresponding to the encryption key according to the private key corresponding to the node role corresponding to the target access terminal, and decrypts the cipher text corresponding to the target data according to the encryption key obtained by decryption, the cipher text corresponding to the encryption key being obtained by performing encryption processing on the encryption key according to a shared key corresponding to the target node role, and the shared key being generated by aggregation according to a public key corresponding to each target node role.

In another exemplary embodiment, the first cipher text transmission module includes: a data broadcast unit, configured to broadcast the cipher text corresponding to the target data and a cipher text corresponding to the encryption key, that are stored in the blockchain, such that the target access terminal decrypts the received cipher text corresponding to the encryption key according to the private key corresponding to the node role corresponding to the target access terminal, and decrypts the cipher text corresponding to the target data according to the encryption key obtained by decryption.

The private key corresponding to the node role corresponding to the target access terminal includes user secret information configured in the target access terminal. The cipher text corresponding to the encryption key is obtained by performing encryption processing on the encryption key according to a key sequence including a role shared key corresponding to each target node role. The role shared key is generated by aggregation according to user secret information configured in each access terminal corresponding to the same target node role.

The apparatus provided in the embodiment and the method provided in the preceding embodiment are based on the same concept. The specific manners of performing operations by each module and unit of the apparatus have been described in detail in the method embodiment, and are omitted here.

The embodiments of the present disclosure further provide an electronic device, including a processor and a memory, and the memory stores computer-readable instructions, the computer-readable instructions, when executed by a processor, implementing the data processing method for a blockchain system as described above.

Figure 7:
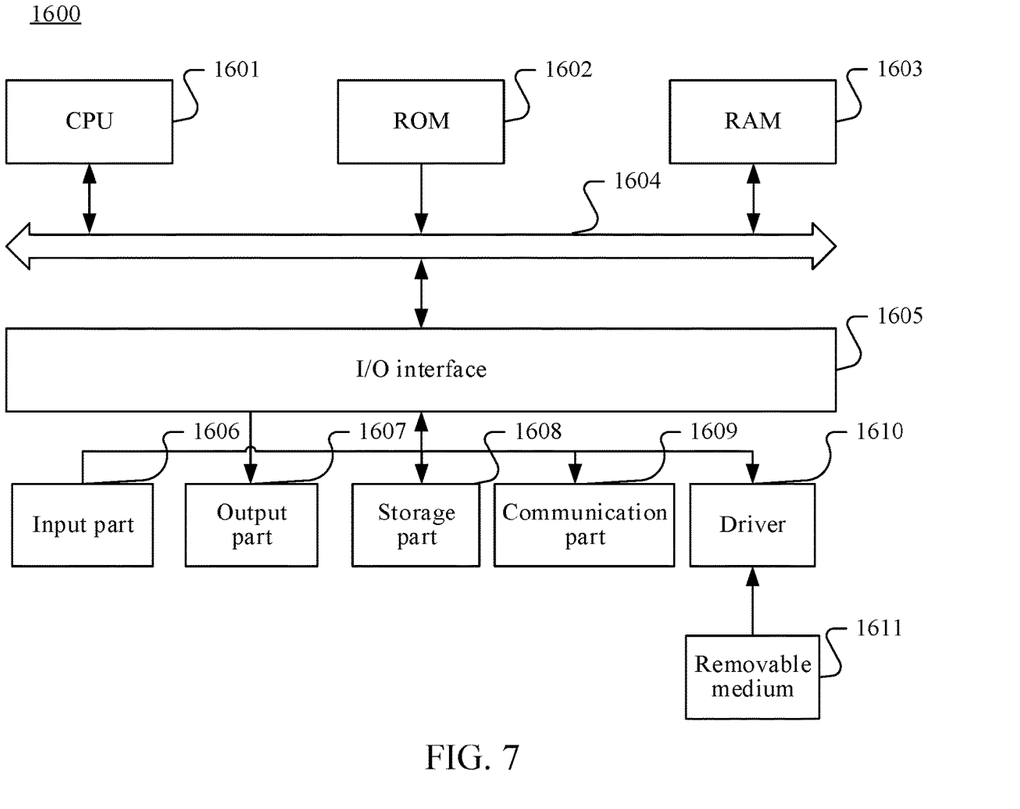
FIG. 7 is a schematic structural diagram of a computer system of an electronic device suitable for implementing certain embodiment(s) of the present disclosure.

FIG. 7 is a schematic structural diagram of a computer system of an electronic device suitable for implementing the embodiment of the present disclosure. The computer system 1600 of the electronic device shown in FIG. 7 is merely an example, and does not constitute any limitation on functions and use ranges of the embodiments of the present disclosure.

As shown in FIG. 7, the computer system 1600 includes a central processing unit (CPU) 1601, which can execute various appropriate actions and processing according to a program stored in a read-only memory (ROM) 1602 or a program loaded from a storage part 1608 to a random access memory (RAM) 1603, such as performing the methods described in the embodiments. The RAM 1603 further stores various programs and data desired for operating the system. The CPU 1601, the ROM 1602, and the RAM 1603 are connected to each other through a bus 1604. An input/output (I/O) interface 1605 is also connected to the bus 1604.

The following components are connected to the I/O interface 1605: an input part 1606 including a keyboard and a mouse, etc.; an output part 1607 including a cathode ray tube (CRT), a liquid crystal display (LCD), a speaker, or the like; a storage part 1608 including hard disk, or the like; and a communication part 1609 including a network interface card such as a local area network (LAN) card, a modem, or the like. The communication part 1609 performs communication processing by using a network such as the Internet. A driver 1610 is also connected to the I/O interface 1605 as desired. A removable medium 1611, such as a magnetic disk, an optical disc, a magneto-optical disk, or a semiconductor memory, is installed on the drive 1610 as desired, so that a computer program read from the removable medium is installed into the storage part 1608 as desired.

Particularly, according to an embodiment of the present application, the processes described above by referring to the flowcharts may be implemented as computer software programs. For example, an embodiment of the present disclosure includes a computer program product. The computer program product includes a computer program stored in a computer-readable medium. The computer program includes a computer program used for performing a method shown in the flowchart. In such an embodiment, the computer program may be downloaded and installed through the communication part 1609 from a network, and/or installed from the removable medium 1611. When the computer program is executed by the CPU 1601, the various functions defined in the system of the present disclosure are executed.

The computer-readable medium shown in the embodiments of the present disclosure may be a computer-readable signal medium or a computer-readable storage medium or any combination of two. The computer-readable storage medium may be, for example, an electrical, magnetic, optical, electromagnetic, infrared, or semiconductor system, apparatus, or device, or any combination thereof. A more specific example of the computer-readable storage medium may include but is not limited to: An electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal in a baseband or propagated as a part of a carrier wave, the data signal carrying a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The computer program included in the computer-readable storage medium may be transmitted using any suitable medium, including but not limited to: a wireless medium, a wire medium, or the like, or any suitable combination thereof.

The flowcharts and block diagrams in the accompanying drawings illustrate system architectures, functions, and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related unit described in the embodiments of the present disclosure may be implemented in a software manner, or may be implemented in a hardware manner, and the unit described may also be set in a processor. Names of the units do not constitute a limitation on the units in a specific scenario.

Another aspect of the present disclosure further provides a computer-readable storage medium on which a computer program is stored. The computer program, when executed by a processor, implements the data processing method for a blockchain system as described above. The computer-readable medium may be included in the electronic device described in the embodiments, or may exist alone and is not disposed in the electronic device.

According to another aspect of the present disclosure, a computer program product or a computer program is provided, including computer instructions, the computer instructions being stored in a computer-readable storage medium. A processor of a computing device reads the computer instructions from the computer-readable storage medium, and the processor executes the computer instructions, to cause the computing device to perform the data processing method for a blockchain system provided in the embodiments.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

What is described above is merely exemplary embodiments of the present disclosure, and is not intended to limit the embodiments of the present disclosure. A person of ordinary skill in the art can easily make equivalent changes or modifications according to the main concept and spirit of the present disclosure. Therefore, the protection scope of the present disclosure is subject to the protection scope specified in the claims.

What is claimed is:

1. A data processing method for a blockchain system, the blockchain system including multiple node devices, each of the multiple node devices being connected with at least one access terminal and corresponding to a node role, the access terminal having a permission of the node role corresponding to the connected node device, the method being performed by a node device in the blockchain system, the method comprising:
    determining, in response to a request of a target access terminal for writing target data to a blockchain, a target node role with a read permission for the target data, the target access terminal being one of access terminals connected with the node device;

acquiring an encryption key corresponding to the target node role;

performing encryption processing on the target data according to the encryption key to obtain a cipher text corresponding to the target data, the cipher text corresponding to the target data being decryptable for an access terminal corresponding to the target node role;

generating a role shared key corresponding to a same target node role by aggregation according to user secret information configured in each access terminal corresponding to the same target node role, performing encryption processing on the encryption key according to a key sequence comprising a role shared key corresponding to each target node role to obtain a cipher text corresponding to the encryption key; and storing the cipher text corresponding to the target data and the cipher text corresponding to the encryption key to the blockchain.

2. The method according to claim 1, wherein the encryption key includes a shared public key; and acquiring the encryption key comprises:
acquiring a public key corresponding to each target node role, and
generating the shared public key by aggregation according to the public key corresponding to each target node role, the cipher text obtained by encrypting the target data based on the shared public key being decryptable for a private key corresponding to each target node role.

3. The method according to claim 2, wherein acquiring the public key comprises:
generating, in the node device, a random number corresponding to each target node role, and
generating the public key corresponding to each target node role according to the random number corresponding to each target node role; and
the method further comprises:
transmitting the random number corresponding to each target node role to the access terminal corresponding to the target node role such that the access terminal generates the private key corresponding to the node role corresponding to the access terminal based on the received random number.

4. The method according to claim 1, wherein the encryption key includes a symmetric key, and acquiring the encryption key comprises:
generating, in the node device, the symmetric key; and
the method further comprises:
transmitting the symmetric key to the access terminal corresponding to the target node role to enable the access terminal corresponding to the target node role to decrypt the cipher text corresponding to the target data according to the received symmetric key.

5. The method according to claim 1, further comprising:
encrypting the encryption key according to a shared key corresponding to each target node role to obtain a cipher text corresponding to the encryption key, wherein
storing the cipher text comprises:
storing the cipher text corresponding to the encryption key and the cipher text corresponding to the target data to the blockchain together.

6. The method according to claim 1, further comprising:
acquiring access terminal signature information in the target data;

verifying the access terminal signature information according to a public key corresponding to a node role corresponding to the target access terminal; and performing, when or in response to determining that the verification of the access terminal signature information succeeds, the operation of determining a target node role with a read permission for the target data.

7. The method according to claim 6, wherein verifying the access terminal signature information comprises:
determining the node role corresponding to the target access terminal according to a key field in the target data; and
searching a locally stored public key list for the public key corresponding to the node role corresponding to the target access terminal, and verifying the access terminal signature information according to the found public key.

8. A data processing method for a blockchain system, the blockchain system including multiple node devices, each of the multiple node devices being connected with at least one access terminal and corresponding to a node role, the access terminal having a permission of the node role corresponding to the connected node device, the method being performed by a node device in the blockchain system, the method comprising:
transmitting, in response to a request of a target access terminal for reading target data, a cipher text corresponding to the target data and a cipher text corresponding to an encryption key stored in a blockchain to the target access terminal, such that the target access terminal decrypts the cipher text corresponding to encryption key according to a private key corresponding to a node role corresponding to the target access terminal, and decrypts the cipher text corresponding to the target data according to the encryption key obtained by decryption to obtain the target data;
the target access terminal being one of access terminals connected with the node device, the cipher text corresponding to the target data being obtained by performing encryption processing on the target data according to the encryption key, and the encryption key being an encryption key corresponding to a target node role with a read permission for the target data; and
the cipher text corresponding to the encryption key being obtained by performing encryption processing on the encryption key according to a shared key corresponding to the target node role, and the shared key being generated by aggregation according to a public key corresponding to each target node role.

9. The method according to claim 8, wherein transmitting the cipher text comprises:
broadcasting the cipher text corresponding to the target data and a cipher text corresponding to the encryption key, that are stored in the blockchain, such that the target access terminal decrypts the received cipher text corresponding to the encryption key according to the private key corresponding to the node role corresponding to the target access terminal, and decrypts the cipher text corresponding to the target data according to the encryption key obtained by decryption.

10. The method according to claim 9, wherein the private key corresponding to the node role corresponding to the target access terminal includes user secret information configured in the target access terminal; the cipher text corresponding to the encryption key is obtained by performing encryption processing on the encryption key according to a key sequence including a role shared key corresponding to each target node role; and the role shared key is generated by aggregation according to user secret information configured in each access terminal corresponding to the same target node role.

11. A data processing apparatus for a blockchain system, the blockchain system including multiple node devices, each of the multiple node devices being connected with at least one access terminal and corresponding to a node role, the access terminal having a permission of the node role corresponding to the connected node device, the apparatus being configured on a node device in the blockchain system, the apparatus comprising: a memory storing computer program instructions; and a processor coupled to the memory and configured to execute the computer program instructions and perform:

determining, in response to a request of a target access terminal for writing target data to a blockchain, a target node role with a read permission for the target data, the target access terminal being one of access terminals connected with the node device;

acquiring an encryption key corresponding to the target node role;

performing encryption processing on the target data according to the encryption key to obtain a cipher text corresponding to the target data, the cipher text corresponding to the target data being decryptable for an access terminal corresponding to the target node role;

generating a role shared key corresponding to a same target node role by aggregation according to user secret information configured in each access terminal corresponding to the same target node role, performing encryption processing on the encryption key according to a key sequence comprising a role shared key corresponding to each target node role to obtain a cipher text corresponding to the encryption key; and storing the cipher text corresponding to the target data and the cipher text corresponding to the encryption key to the blockchain.

12. The data processing apparatus according to claim 11, wherein the encryption key includes a shared public key; and acquiring the encryption key includes:

acquiring a public key corresponding to each target node role, and generating the shared public key by aggregation according to the public key corresponding to each target node role, the cipher text obtained by encrypting the target data based on the shared public key being decryptable for a private key corresponding to each target node role.

13. The data processing apparatus according to claim 12, wherein acquiring the public key includes:

generating, in the node device, a random number corresponding to each target node role, and generating the public key corresponding to each target node role according to the random number corresponding to each target node role; and the method further includes:

transmitting the random number corresponding to each target node role to the access terminal corresponding to the target node role such that the access terminal generates the private key corresponding to the node role corresponding to the access terminal based on the received random number.

14. The data processing apparatus according to claim 11, wherein the encryption key includes a symmetric key, and acquiring the encryption key includes:

generating, in the node device, the symmetric key; and the method further includes:

transmitting the symmetric key to the access terminal corresponding to the target node role to enable the access terminal corresponding to the target node role to decrypt the cipher text corresponding to the target data according to the received symmetric key.

15. The data processing apparatus according to claim 11, wherein the processor is further configured to execute the computer program instructions and perform:

encrypting the encryption key according to a shared key corresponding to each target node role to obtain a cipher text corresponding to the encryption key, wherein storing the cipher text includes:

storing the cipher text corresponding to the encryption key and the cipher text corresponding to the target data to the blockchain together.

16. The data processing apparatus according to claim 11, wherein the processor is further configured to execute the computer program instructions and perform:

acquiring access terminal signature information in the target data;

verifying the access terminal signature information according to a public key corresponding to a node role corresponding to the target access terminal; and performing, when or in response to determining that the verification of the access terminal signature information succeeds, the operation of determining a target node role with a read permission for the target data.

17. The data processing apparatus according to claim 16, wherein verifying the access terminal signature information includes:

determining the node role corresponding to the target access terminal according to a key field in the target data; and searching a locally stored public key list for the public key corresponding to the node role corresponding to the target access terminal, and verifying the access terminal signature information according to the found public key.

* * * * *